Jan. 15, 1929.　　　　　　　　　　　　　　　　1,698,768
E. MOSCONI
OPTICAL ATTACHMENT FOR LIQUID PUMPS
Filed June 13, 1927

INVENTOR.
Enrique Mosconi
BY Emil Bønnelycke
ATTORNEY.

Patented Jan. 15, 1929.

1,698,768

UNITED STATES PATENT OFFICE.

ENRIQUE MOSCONI, OF BUENOS AIRES, ARGENTINA.

OPTICAL ATTACHMENT FOR LIQUID PUMPS.

Application filed June 13, 1927, Serial No. 198,588, and in Argentina April 19, 1927.

This invention relates to an optical attachment comprising mirrors or prisms adapted to positively control the exact quantity of liquid fuels (oil, kerosene, etc.), delivered to consumers from the common supply pumps at filling stations.

It has been experimentally ascertained that the said fuel supplies provided on the streets, "garages" or other places, for the sale of oil or other liquid fuel, deliver to the customer a lesser quantity than that which he believes he is receiving, due to an optical error.

In effect, the container, or containers, of the said supplies are generally made of transparent glass and enclose a scale provided with successive metal levels indicating the quantity of liquid contained in the container as such liquid successively reaches each of such levels.

Due to the fact that the said container, or containers, are situated at a higher level than the level corresponding to the buyer's eyes, the buyer believes that the liquid has effectively reached the metal level placed within the container, whereas, in fact, such level has not yet been reached by the surface of the liquid and, therefore, the quantity of liquid delivered to the consumer is, in fact, less than that indicated by the corresponding level on the scale.

As a final result, the parties exploiting such supply pumps obtain an illegitimate benefit which may be estimated at from 6 to 10% of the total quantity sold.

Figure 1:
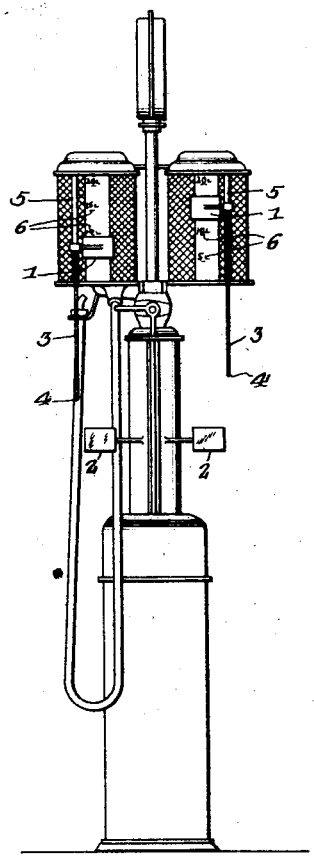
Figure 2:
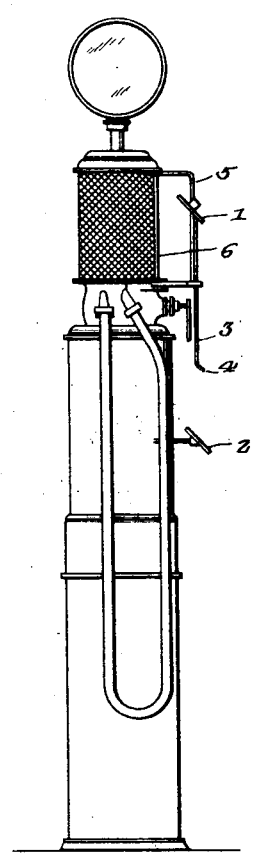

In order to overcome the said disadvantage, the present construction has been devised which is shown on the annexed drawing in which Figure 1 is a front view of a fuel filling pump showing the optical attachment thereon, and Fig. 2 is a side view thereof. The attachment essentially consists of two mirrors or reflectors 1 and 2, one of which is situated at a level corresponding with the level of the consumer's eye, and is fixed and the other one is situated at a level with the container containing the liquid which is to be delivered. The mirror 1 is secured to a metallic rod 3 and, by means of a handle 4, may be displaced vertically guided by a second metallic rod 5 as required by the user of the device in controlling the level of liquid within the container.

The mirror 1 situated at the same level as the container will reflect the exact position of the surface of the liquid reaching successively the metal levels 6 of the scale, without any possible optical illusion; the image being thus transmitted to the mirror 2 and hence to the consumer's eye who may place himself in accordance therewith.

This type of measure indicating mirror as above described is of a very simple and economical construction, which permits its acquisition and installation on apparatus already in use.

In a subsidiary manner, the two mirrors, or one of them, might be substituted by a crystal prism.

Having thus fully described and ascertained the nature of my said invention and the manner in which the same is to be carried into practice, what I claim is:—

An optical attachment for liquid filling pumps having a transparent container comprising a rod vertically mounted adjacent the container; a mirror slidably mounted on said rod; a second rod secured to said mirror having a handle end to adjust the mirror to the level of the liquid in the container; and a fixed mirror arranged at a lower level than the first-mentioned mirror, said mirrors cooperating with each other to accurately indicate the level of the liquid in the container by observing the fixed mirror.

In testimony whereof I affix my signature.

ENRIQUE MOSCONI.